J. J. McMILLEN.
LAWN MOWER ATTACHMENT.
APPLICATION FILED NOV. 16, 1910.

1,028,051.

Patented May 28, 1912.

Witnesses
F. C. Gibson.
V. B. Hillyard.

Inventor
John J. McMillen.
By Victor J. Evans
Attorney

UNITED STATES PATENT OFFICE.

JOHN J. McMILLEN, OF CORNING, NEW YORK.

LAWN-MOWER ATTACHMENT.

1,028,051.  Specification of Letters Patent.  Patented May 28, 1912.

Application filed November 16, 1910. Serial No. 592,730.

*To all whom it may concern:*

Be it known that I, JOHN J. MCMILLEN, a citizen of the United States, residing at Corning, in the county of Steuben and State of New York, have invented new and useful Improvements in Lawn-Mower Attachments, of which the following is a specification.

The primary intention of the present invention is the provision of means whereby the force of the lawn mower is increased, thereby preventing slipping and insuring a positive rotation of the cutting mechanism with the result that the work is greatly facilitated and positive action of the cutting mechanism assured at all times both upon level surfaces and sloping ground.

The invention consists of a toothed disk secured to one or both drive wheels of a lawn mower to sustain the weight of the machine wholly or in part, the teeth penetrating the ground and serving to steady the mower when in operation and to prevent side draft thereof and also to insure positive rotation of the drive wheel and the cutting mechanism deriving motion therefrom.

The invention consists of the novel features, details of construction and combination of parts which hereinafter will be more particularly set forth, illustrated in the accompanying drawing, and pointed out in the appended claim.

Figure 1:
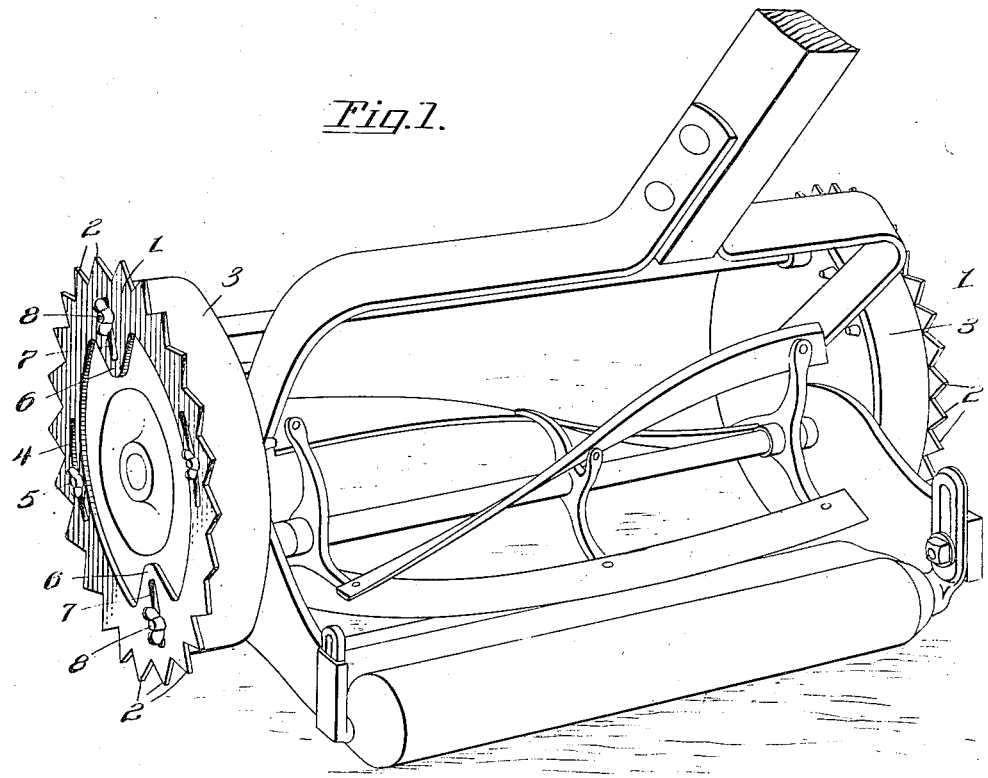
Figure 2:
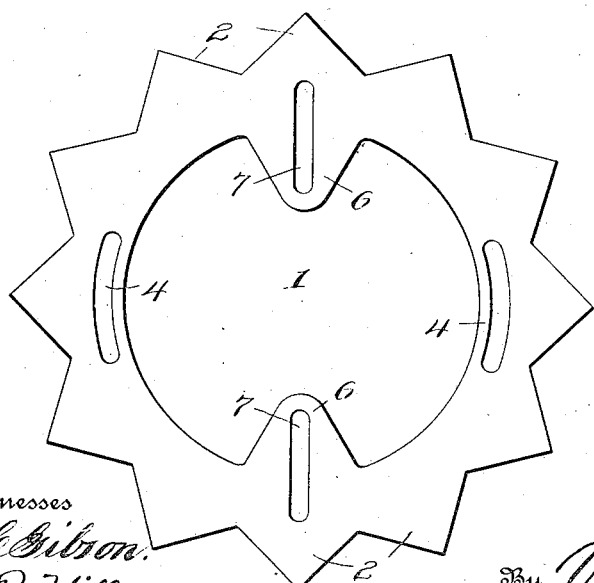
Figure 3:
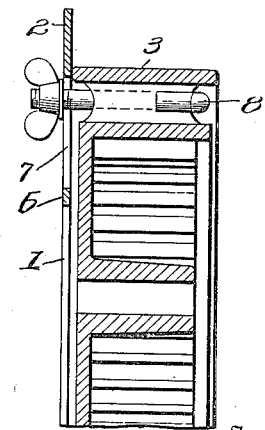

Referring to the drawing, forming a part of the application, Figure 1 is a detail view of a lawn mower provided with toothed disks applied thereto in accordance with this invention. Fig. 2 is a detail view of a toothed disk forming the attachment. Fig. 3 is a detail view showing the manner of securing the attachment to the drive wheel of a lawn mower.

Corresponding and like parts are referred to in the following description, and indicated in all the views of the drawing, by the same reference characters.

It is to be understood that the attachment is designed for the various makes and types of lawn mowers and in adapting the same to meet the varying conditions the size and number of teeth of the disk will vary as also the means for attaching the toothed disks to the drive wheels of the lawn mower.

It is preferred to provide each of the drive wheels of a lawn mower with a toothed disk embodying the invention, thereby preventing slipping of each of the mower wheels and insuring a uniformity of action and producing a smooth running machine which will prevent side draft and result in efficient work.

The toothed disk is indicated at 1 and may be of any construction being usually cut from sheet metal of proper gage and of a diameter corresponding to the diameter of the mower wheel allowance being had for proper projection of the teeth so that the same may penetrate the surface of the ground to the required depth. The center portion of the disk 1 is usually cut away and the outer edge of the disk is formed with points or teeth 2 which may be of any length according to the desired depth of penetration required. The toothed disk 1 may be secured to the drive wheel 3 of the mower in any manner to insure rotation of the two wheels. The diameter of the disk 1 is such as to enable the teeth 2 to project beyond the tread of the wheel 3 and as much of the disk 1 as may be found advantageous according to the desired work and the nature of the mower to which the invention is adapted. Openings 4 are formed in the disk 1 to receive fastenings 5 which latter consist of bolts having thumb nuts, the bolts passing between the spokes of the drive wheel 3 or through openings formed in said drive wheel. As additional means for securing the disk 1 to the wheel 3, ears 6 project from the inner edge of the disk 1 and have openings 7 through which bolts or studs 8 of the drive wheel 3 extend. The disk 1 may be formed in any manner and when applied to the drive wheel 3 of the mower prevents slipping of the drive wheel as the mower is propelled over the lawn to be trimmed. Upon terraces and sloping ground the teeth and outer edge portion of the disk 1 prevents slipping and hold the mower to its work, as will be readily understood.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claim appended hereto.

Having thus described the invention, what I claim as new is:—

An attachment for the drive wheels of lawn mowers, the same comprising a disk having its outer portion toothed and having slots extending circumferentially and further provided with inwardly extending lugs and having radial slots in line with and partly entering said lugs, the several slots adapted to receive fastenings for connecting the disk to the drive wheel of the mower.

In testimony whereof I affix my signature in presence of two witnesses.

JOHN J. McMILLEN.

Witnesses:
M. J. MOORE,
JOHN DOWLING.